Figure 1:
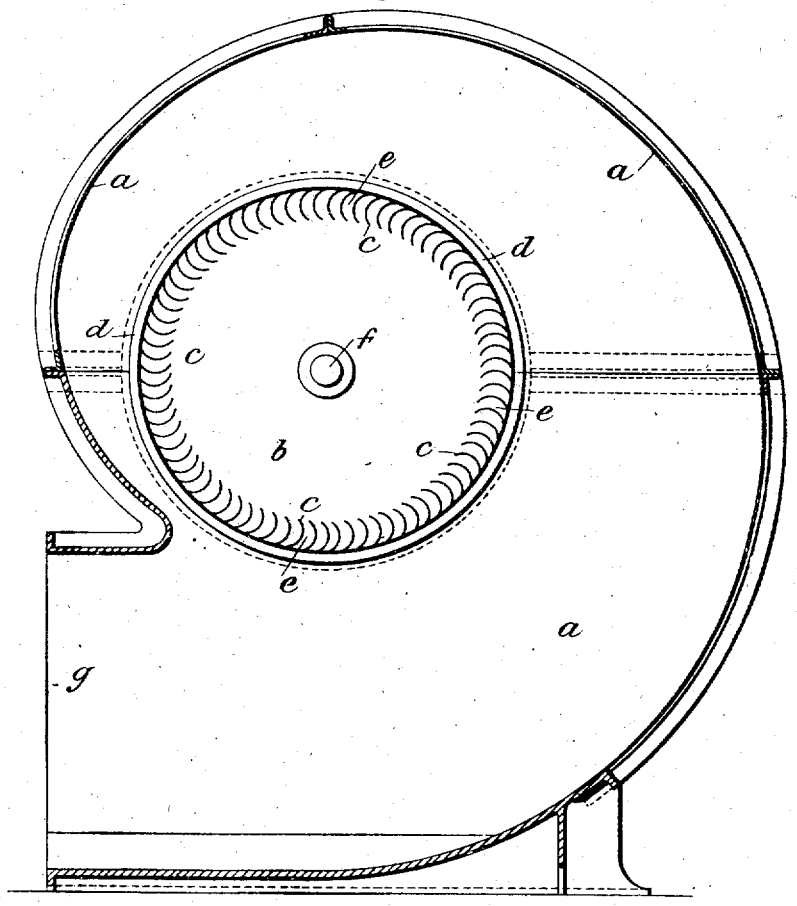

No. 12,796. REISSUED MAY 26, 1908.

S. C. DAVIDSON.

CENTRIFUGAL FAN OR PUMP.

APPLICATION FILED MAR. 16, 1908.

6 SHEETS—SHEET 1.

WITNESSES:

Fred White

Thomas F. Wallace

INVENTOR:

Samuel Cleland Davidson,

By Attorneys,

Arthur C. Fraser & Co.

No. 12,796.

REISSUED MAY 26, 1908.

S. C. DAVIDSON.

CENTRIFUGAL FAN OR PUMP.

APPLICATION FILED MAR. 16, 1908.

6 SHEETS—SHEET 2.

Fig's 3 to 10, inclusive, omitted. See Spec.

INVENTOR:

Samuel Cleland Davidson,

By Attorneys,

Arthur C. Fraser & Ussia

WITNESSES:

Fred White

Thomas Walker

No. 12,796. REISSUED MAY 26, 1908.

S. C. DAVIDSON.

CENTRIFUGAL FAN OR PUMP.

APPLICATION FILED MAR. 16, 1908.

6 SHEETS—SHEET 3.

INVENTOR:

Samuel Cleland Davidson,

By Attorneys,

Arthur C. Fraser & Sons,

WITNESSES:

Fred White

Thomas F. Wallace

No. 12,796. REISSUED MAY 26, 1908.
S. C. DAVIDSON.
CENTRIFUGAL FAN OR PUMP.
APPLICATION FILED MAR. 16, 1908.
6 SHEETS—SHEET 4.
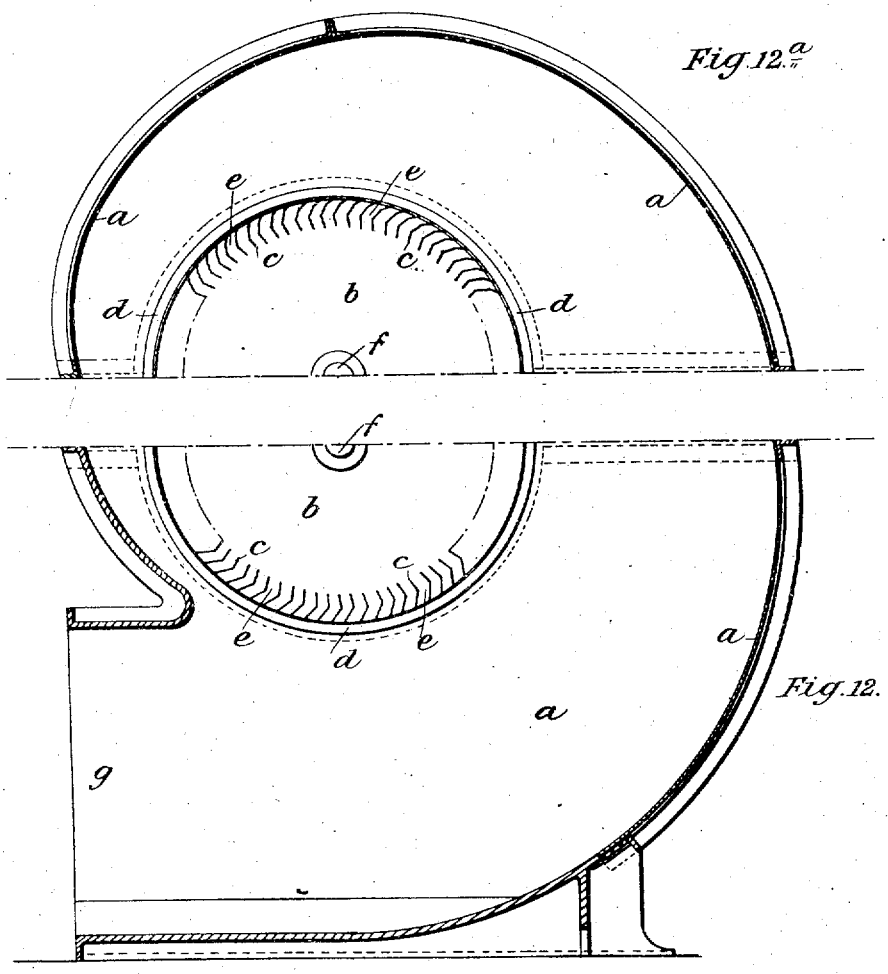
INVENTOR:
Samuel Cleland Davidson,
By Attorneys,
Arthur C. Fraser & Co.
WITNESSES:
Fred White
Thomas Wallace No. 12,796. REISSUED MAY 26, 1908.

S. C. DAVIDSON.

CENTRIFUGAL FAN OR PUMP.

APPLICATION FILED MAR. 16, 1908.

6 SHEETS—SHEET 5.

Fig's 14, 21, 22, 23 & 25 Omitted. See Spec.

WITNESSES:

Fred. White

Thomas Wallace

INVENTOR:

Samuel Cleland Davidson,

By Attorneys,

Arthur C. Fraser & Henry

No. 12,796. REISSUED MAY 26, 1908.
S. C. DAVIDSON.
CENTRIFUGAL FAN OR PUMP.
APPLICATION FILED MAR. 16, 1908.
6 SHEETS—SHEET 6.
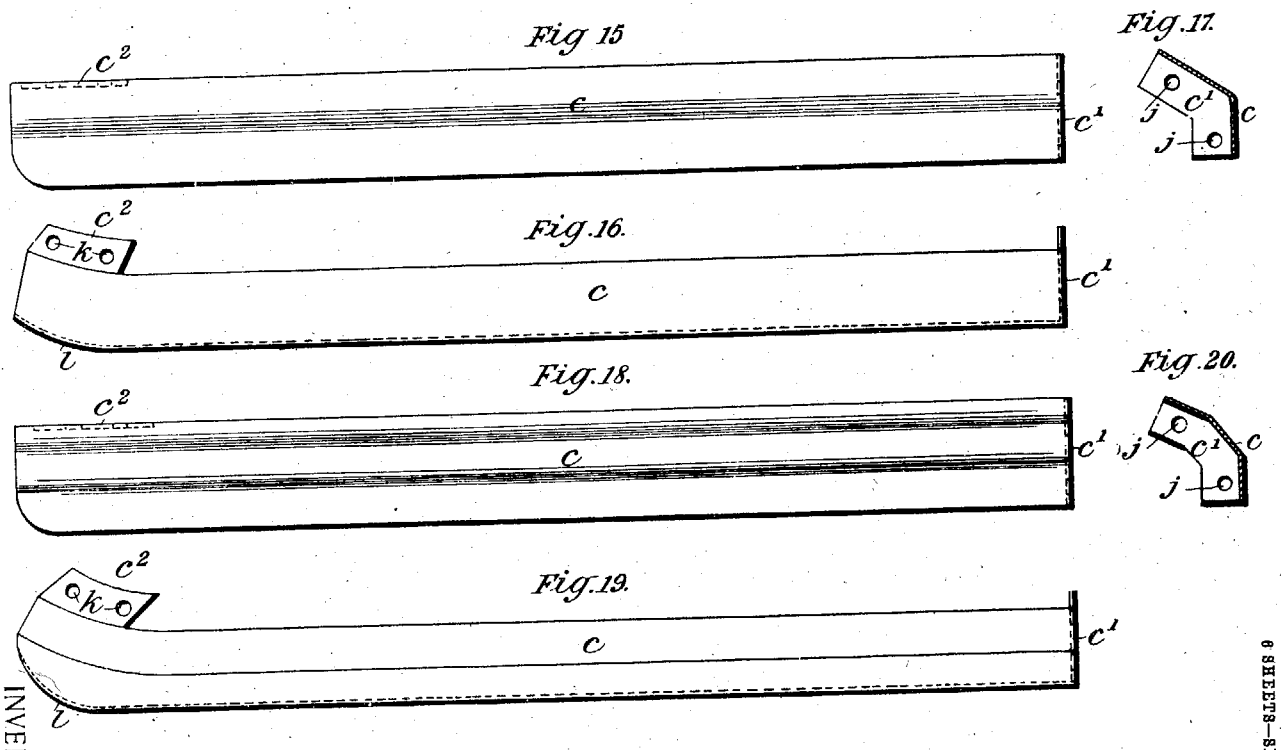
INVENTOR:
Samuel Cleland Davidson,
By Attorneys,
Arthur C. Fraser & Co.
WITNESSES:
Fred White
Thomas Mellad

UNITED STATES PATENT OFFICE.

SAMUEL CLELAND DAVIDSON, OF BELFAST, IRELAND, ASSIGNOR TO SIROCCO ENGINEERING COMPANY, OF JERSEY CITY, NEW JERSEY, A CORPORATION OF NEW JERSEY.

CENTRIFUGAL FAN OR PUMP.

No. 12,796. Specification of Reissued Letters Patent. Reissued May 26, 1908.

Original No. 662,395, dated November 27, 1900, Serial No. 691,495. Application for reissue filed March 16, 1908. Serial No. 421,590.

DIVISION A.

*To all whom it may concern:*

Be it known that I, SAMUEL CLELAND DAVIDSON, of Belfast, Ireland, have invented certain new and useful Improvements in Centrifugal Fans or Pumps, (Division A,) of which the following is a specification.

My invention has reference to rotary fans or pumps in which the fluid operated on is taken in axially and discharged circumferentially; and it relates to centrifugal fans or pumps in which the blades carry the fluid with them in their rotation, and thereby throw it outward by centrifugal force, as distinguished from propeller fans or pumps in which the blades act upon the fluid with a wedging action, pushing it from them without materially rotating it.

The object of this invention is to improve the efficiency of such centrifugal fans or pumps by increasing the volume and pressure of the fluid drawn into and discharged therefrom relatively to their diameter and speed of rotation.

In this specification the word "fan" is understood as including a pump. The word "axially" means in a direction coincident with or parallel with the axis of rotation. The word "blades" is used to indicate the vanes or wings which impart motion to the fluid. The expression "intake-chamber" is employed to indicate a chamber or space inclosed within the series of blades. The word "eye" is used to designate the inlet-opening in the casing or stationary member of the fan, through which opening the fluid enters the intake-chamber. By the "intake" end of the blades or ports is understood that end which is nearest the eye. The "depth" of the blades is their width measured radially from the inner to the outer edge, the "length" of the blades is their axial measurement, and the "ports" are the intervening spaces between the blades.

According to my invention the rotary member of the fan is constructed with numerous thin elongated blades arranged in substantially drum form, being extended in approximately axial direction, so as to inclose within them a relatively large and practically-unobstructed intake-chamber, and said blades in transverse section being arranged relatively to the axis and direction of rotation to carry the fluid with them rotatively and discharge it tangentially, and said rotary member is so mounted as to permit the tangential escape of the fluid discharged from its blades. The blades are best made of sheet metal and are elongated—that is to say, their length approximates at the least three times their depth and being preferably as much as nine or more times their depth—it being preferable to make them as narrow or shallow as practicable consistent with strength of construction. Preferably their inner and outer edges are substantially parallel to each other. The blades must be so shaped relatively to the axis and direction of rotation as to carry the fluid with them in their rotation in order to throw it outward by centrifugal force, whereby it is discharged tangentially. To this end the blades may be formed with a plane surface and arranged in radial planes or they may be made in two or more planes at an angle to each other with their outer edges turned or inclined forward—that is, in the direction of rotation—or they may be formed as curved plates with their outer edges turned forward, so that the concave of said curve is on the forward or advancing side, this latter construction being preferred. The blades are so numerous as to follow each other in close succession, being spaced apart preferably a distance approximating two-thirds of their radial depth. The drum-like arrangement of the blades is such as to inclose within them an intake-chamber, which preferably is approximately cylindrical and which is of large dimensions as compared with fans heretofore existing. Its diameter in the preferred proportions is five-sixths of the external diameter of the series of blades, and its length or axial dimension approximates at least three times the depth of the individual blades and in the preferred proportions is approximately nine times such depth.

When I employ angled or curved blades, I mount them so that while their concave faces are toward the direction of rotation their outer edges are tilted forward slightly, so that they have a lead in the direction of rotation relatively to their inner edges, and preferably enough so that the clear width of the ports between the blades at their outer edges is narrower and consequently less in area than at their inner edges.

The drum-like series of blades is supported in any suitable manner upon a shaft or spindle revolving in suitable bearings. A convenient supporting means consists of a disk mounted on the spindle, to which disk the blades are attached at their ends remote from the intake ends. A ring or annular support is preferably provided for the opposite or intake ends of the blades.

The rotary member of the fan is suitably mounted to permit the tangential escape of the fluid discharged from its blades. If not incased, this fluid can freely escape from it in all directions. If inclosed in a casing, the latter must be so constructed as to permit the tangential escape of the fluid—as, for example, by forming the casing of the usual snail shape with a tangential outlet beyond the periphery of the rotary member.

In the operation of my new fan the fluid flows in axial direction into the intake-chamber, in which it expands without perceptibly revolving until it is caught by the blades and drawn into the ports between them, whereby the fluid in these ports is converted into a whirling shell of fluid, whereby it is thrown outward by centrifugal force and discharges from the outer sides of the ports as a whirling and expanding shell of fluid, the individual particles of which move in tangential direction. The blades are so narrow and so close together that no eddy-currents are caused in the ports between them, thus avoiding the loss of efficiency and the whirring or beating noise accompanying the operation of centrifugal fans as heretofore made.

My improved fans or pumps when constructed as herein described may be employed with any fluids, either gaseous or liquid—as, for instance, with air or water.

Figure 2:
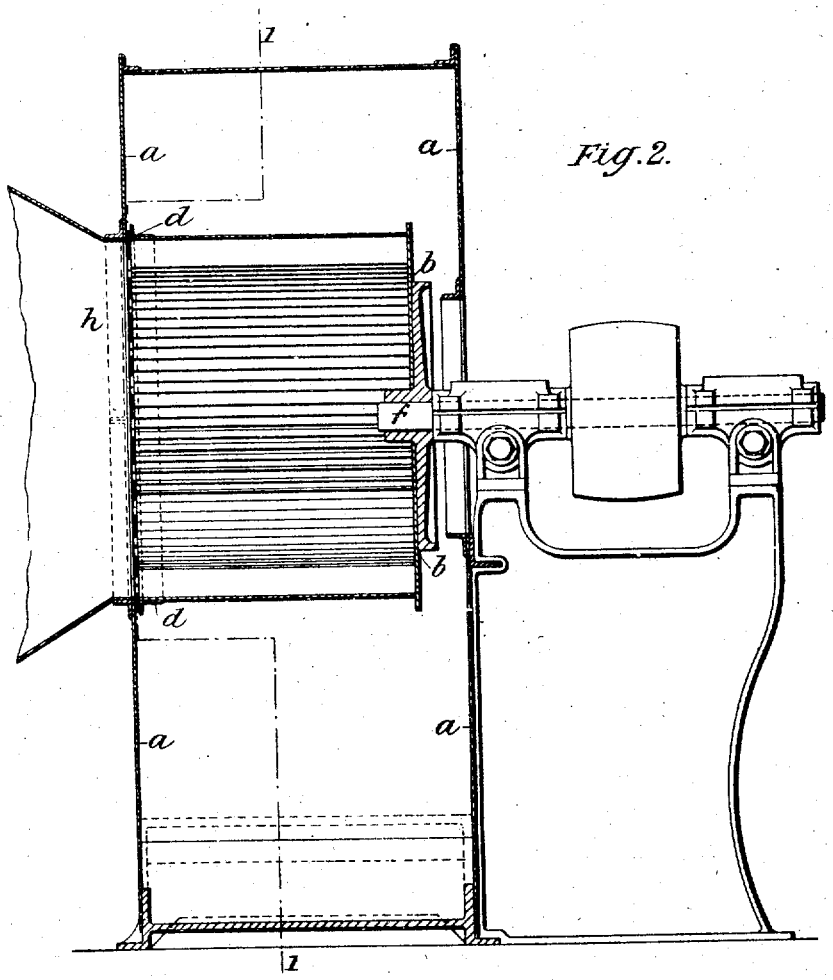
Figure 13:
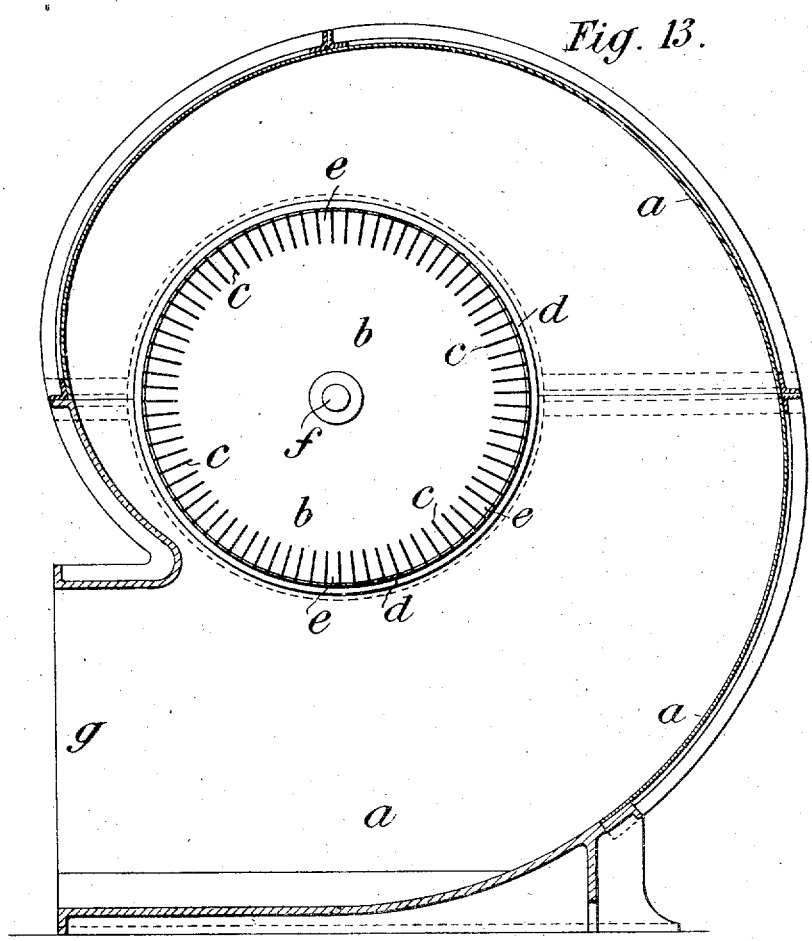
Figure 11:
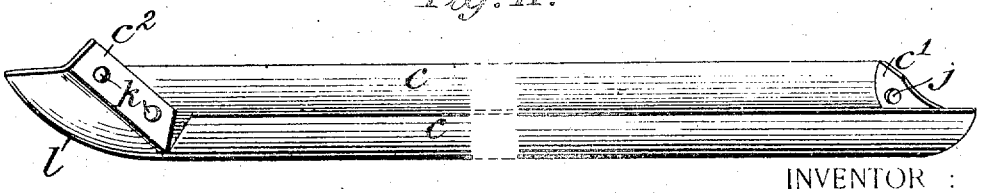
Figure 12B:
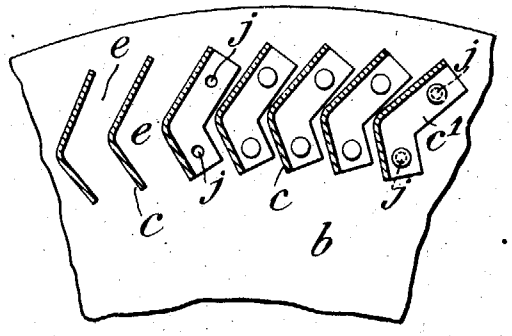
Figure 24:
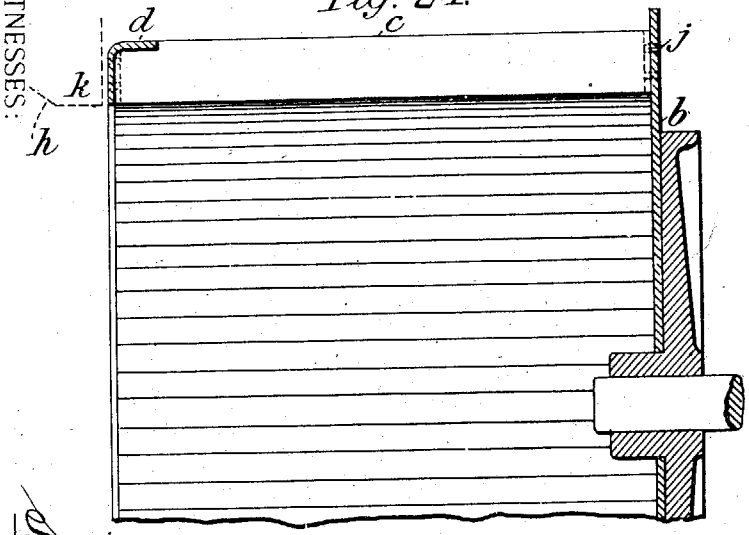
Figure 26:
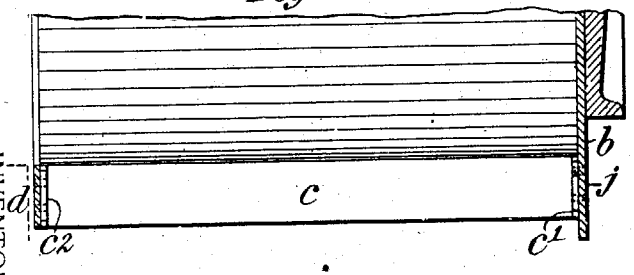

In the accompanying drawings, Figure 1 is a sectional elevation on the line 1 1 of Fig. 2, illustrating the preferred embodiment of my invention. Fig. 2 is a cross-sectional elevation thereof. (Figs. 3 to 10 inclusive of the drawings of my original patent are here omitted). Fig. 11 is a perspective view of one of the blades shown in Figs. 1 and 2. Figs. 12 and $12^a$ are sectional elevations, respectively, of the lower and upper half of the fan with two forms of angle blades. Fig. $12^b$ is a fragmentary cross-section showing a portion of the blades of Fig. 12 on a larger scale. Fig. 13 is a sectional elevation of the fan with flat blades in radial planes. (Fig. 14 of my original patent is here omitted). Figs. 15, 16 and 17 are detail views, on a larger scale, of a blade formed in two planes, as in Fig. 12. Figs. 18, 19 and 20 are similar views of a blade formed in three planes, as in Fig. $12^a$. Figs. 24 and 26 are fragmentary sectional elevations corresponding to portions of Fig. 2 and illustrating two modified constructions for supporting the intake ends of the blades, (Figs. 21–23 and Figs. 25, 27 and 28 of the drawings of my original patent are here omitted).

Referring to the drawings, *a* in Figs. 1, 2, 12 and 13 designates a casing in which the rotary member of the fan is inclosed. It has an eye *h*, Fig. 2, through which the supply of fluid is drawn, and is shown with a discharging-mouthpiece *g*. The rotary member comprises blades *c c*, suitably supported upon a revolving shaft or spindle *f*. The support shown comprises a disk *b*, to which the blades are attached at one end, and an annular support for the opposite or intake ends of the blades. In Figs. 1, 2, 12 and 13 this support is formed by a ring *d*, to which the intake ends are riveted. The blades *c c* have at one end flanges *c'*, by which they are attached to the disk *b*, *j j* being holes in said flanges to give passage to the rivets or attaching devices. At the intake ends of the blades they may have flanges $c^2$, by which they are attached to the ring *d* in the manner shown in Fig. $12^b$. The flanges $c^2$ have holes *k k* to give passage to the rivets or attaching devices. The forwardly-tilted spoon-shaped intake ends of the blades are designated at *l*.

The ports or intervening spaces between the blades are lettered *e e*. In Fig. 1 it will be noticed that the width of these ports at the outer edges of the blades, is somewhat less than at their inner edges, owing to said outer edges of the blades, being tilted slightly forward relatively to a radial line. By thus turning forward the outer edges of the blades the outer or discharging area of the ports is reduced to less than their inner or inlet area. The same result may be attained with angle-blades, as shown, for example, in Fig. $12^a$.

In proportioning the parts I make the length of the blades such that the aggregate open area of the ports around the periphery of the fan shall be at least equal to the area of the inlet-opening, when the maximum volume of intake and discharge is required; but the length of the blades may be varied to suit any special requirements.

The preferred proportions of my fan are shown in Figs. 1 and 2, where the radial depth of the blades is one-twelfth of the diameter of the fan and the length of the blades is nearly nine times their depth. This construction affords a large intake-chamber of approximately cylindrical form, the diameter of which is ten times the depth of the individual blades, while its length, equaling that of the blades, is about nine times this dimension. The blades in Figs. 1, 2 and 3 are shown spaced apart a distance approximating one-half their radial depth.

The provision of a relatively large intake-chamber in connection with shallow blades following each other at frequent intervals is a distinctive feature of my invention. In fans as ordinarily constructed, employing blades of great radial measurement, supplementary vibrations and eddies are set up, which reduce the efficiency of the fan. In those fans also in which the blades are extended inwardly to or near the axis the best efficiency is not obtained. I have discovered that by providing a relatively large intake-chamber practically unobstructed by the projection into it of blades or other parts and by employing blades which extend as short a distance from the periphery of the fan inward as is consistent with strength of construction the said supplementary vibrations and eddies are minimized and the velocity and volume of fluid discharged for a given speed of revolution are greatly increased.

The blades may be flat and in radial planes, as shown in Fig. 13, or they may be bent angularly into two or more planes, as shown in Figs. 12 and 12ª, or they may be curved, as shown in Figs. 1 and 3, the curved form being preferable.

It has hitherto been considered impossible to get pressure or partial exhaust with centrifugal fans unless the blades are inclosed on the sides and the eye or opening is of not greater diameter than about one-half the diameter of the fan. With my present invention, however, the eye may be of equal diameter to that of the fan periphery. This is clearly shown in Fig. 2. This is made possible by making the intake ends of the blades open or unobstructed, so as to form open-ended ports between them. To support and strengthen the intake ends of the blades, I prefer to make them laterally curved as shown at *l* in Fig. 11.

When greater strength of construction is required, as when the fan or pump has to be driven at a very high velocity or when it has to be employed for pumping a heavy medium, as a liquid, the intake ends of the blades may be closed in the manner shown in Figs. 24 and 26. In the modification shown in Fig. 24 the intake ends of the blades are closed by projecting the flange of the encircling ring *d* inward. In the modification shown in Fig. 26 the intake ends are closed by a flat connecting-ring, to which they are attached in the same manner as they are attached to the disk *b* at their opposite ends.

It is obvious that in the fan or pump shown in Figs. 1 and 2 and also in others (shown, respectively, in Figs. 12, 12ª and 13 and in those shown in Figs. 24 and 26) the casing *a* may project inward over the edges of the blades *c c*, (as shown in dotted lines in Figs. 24 and 26) but the inlet-opening or eye to the fan should not be thereby reduced to less than five-sixths of the diameter of the fan.

It is essential to my invention that the fan-blades shall be adapted to carry the fluid with them rotatively, so that it shall be thrown outward by centrifugal force and be discharged tangentially, in contradistinction to merely exerting a wedge-like action upon the fluid, tending to thrust it outward in radial direction unaccompanied by any material rotation or whirling of the fluid. In a true centrifugal fan it is almost solely the rear surface of the blade which acts upon the fluid, drawing it around by suction, whereas in blades which thrust the fluid outward by a wedge-like action it is the front or advancing side of the blade which is the active face. Blades of the latter kind require to be inclined or curved rearwardly to a considerable angle especially at the outer edge which follows behind the middle or major portion of the blade. I use the expression "in transverse section arranged, relatively to the axis and direction of rotation, to carry the fluid with them rotatively and discharge it tangentially" to exclude such wedging blades and include generically any form of blade adapted to act upon the air by rotating or whirling it, thus including blades which are substantially radial, as well as those which incline forwardly, and either flat, curved, or angled.

The operation of my fan when propelling air is accompanied by the existence of a thin shell or film of rapidly-whirling air immediately surrounding the drum-like series of blades, which air is apparently compressed, and outside of this shell the air discharging from the fan escapes tangentially. Whether the fan is provided with a casing or not the construction must be such as to permit the whirling fluid dicharged from the blades to escape tangentially therefrom in outward direction.

To realize the full advantages of my invention, it is practically essential that the inflow of fluid to the intake-chamber be unobstructed and that the inlet-opening be of the full diameter of said chamber, as any throttling of this opening results in a proportionate diminution of volumetric efficiency. It is also practically essential that the whirling fluid discharged from the fan-blades shall be permitted to escape tangentially outward therefrom, as any attempt to divert the revolving fluid inwardly results in a rapid diminution of efficiency; but the whirling fluid can be collected in a casing, and if the outlet from this casing be arranged beyond the radius of the circle described by the outer edges of the blades the fluid will freely escape through said outlet, its whirling motion being thereby resolved into a direct motion, after which it can be led through a suitable conduit in any desired direction.

The fan provided by my present invention is distinguished from that shown in Fig. 7 of my United States Patent No. 544,758, wherein the blades are triangular and project into the central hub, that in my present form the blades are extended approximately parallel to the axis of rotation, being arranged in drum form, so as to inclose within them an approximately cylindrical intake-chamber which is practically unobstructed by blades or other parts.

The modification shown in Fig. 13, wherein the blades are flat and radial, is not specifically claimed in my present application, but is so claimed in my application, Serial No. 740,399, filed December 15, 1899, as a division of my present application (Patent No. 662,396, dated Nov. 27, 1900); nor is a construction wherein the rotary member is uninclosed by any casing, so that the fluid discharged from the blades may freely escape tangentially in all directions, specifically claimed in my present application, this feature being so claimed in my application Serial No. 17,366, filed May 21, 1900, (Patent No. 662,397, dated November 27, 1900), which also is a division of my present application.

The present reissue (Division A) of my original Letters Patent is directed to that feature of my invention which is characterized by the provision of a relatively large intake chamber with numerous elongated blades which are so narrow radially and so remote from the axial center that their inner edges revolve at a peripheral speed so nearly approaching that of their outer edges that fluid is drawn in at their inner edges at approximately the same rate as it is discharged from their outer edges; or, otherwise stated, that the ports between the blades are not materially wider at their exterior or discharge ends than at their interior or inlet ends; and irrespective of whether the blades are radial, angular or curved in cross-section; and irrespective of whether the ports between the blades are of substantially uniform width and area at their interior or inlet and at their exterior or outlet ends, or are of diminished width and area at their outlet ends.

I make no claim in my present reissue to those features of my invention which are characterized by the inclining of the outer edges of the blades forward or in the direction of rotation, to such effect that the outer width of the ports between the blades is no greater (and is preferably less) than their interior or inlet width; and by the employment of curved blades with their outer edges so inclined forward and which are concave on their advancing sides; these being claimed in another reissue (Division B) of my said original Letters Patent. Nor do I claim herein that feature of my invention which is characterized by the blades being open at their intake ends, (being preferably curved transversely at their intake ends to stiffen them); this being claimed in another reissue (Division C) of my said original Letters Patent.

I claim as my invention the following defined novel features, substantially as hereinbefore specified, namely:—

1. A centrifugal fan or pump, comprising a rotary member having numerous elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, and a means for so mounting said rotary member as to permit the tangential escape of the fluid discharged from said blades.

2. A centrifugal fan or pump, comprising a rotary member having numerous thin elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, and spaced apart a distance approximating two-thirds of their radial depth, and a means for so mounting said rotary member as to permit the tangential escape of the fluid discharged from said blades.

3. A centrifugal fan or pump, comprising a rotary member having numerous elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, the blades being narrow radially in proportion substantially as set forth, and a means for so mounting said rotary member as to permit the tangential escape of the fluid discharged from said blades.

4. A centrifugal fan or pump, comprising a rotary member having numerous elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, to such effect that the ports between the blades are not materially wider or of greater area at their outer or discharge ends than at their interior or inlet ends, and a means for so mounting said rotary member as to permit the tangential escape of the fluid discharged from said blades.

5. A centrifugal fan or pump, comprising a rotary member having numerous elongated blades of a length approximating nine or more times their radial depth arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, and a means for so mounting said rotary member as to permit the tangential escape of the fluid discharge from said blades.

6. A centrifugal fan or pump, comprising a rotary member having numerous elongated blades arranged lengthwise in approximately axial direction, and in substantially drum form, so as to inclose within them a relatively large and practically-unobstructed intake-chamber of a diameter approximating ten times the radial depth of the individual blades, and in transverse section arranged, relatively to the axis and direction of rotation, to carry the fluid with them rotatively and discharge it tangentially, and a means for so mounting said rotary member as to permit the tangential escape of the fluid discharged from said blades.

7. A centrifugal fan or pump, comprising a rotary member having numerous elongated blades of a length approximating nine or more times their radial depth, said blades arranged lengthwise in approximately axial direction, and in substantially drum form, so as to inclose within them a relatively large and practically-unobstructed intake-chamber of a diameter approximating ten times the radial depth of the individual blades, and in transverse section arranged, relatively to the axis and direction of rotation, to carry the fluid with them rotatively and discharge it tangentially, and a means for so mounting said rotary member as to permit the tangential escape of the fluid discharged from said blades.

8. A centrifugal fan or pump, comprising a rotary member having numerous thin elongated blades arranged lengthwise in approximately axial direction, and in substantially drum form, so as to inclose within them a relatively large and practically - unobstructed intake-chamber, and in transverse section arranged, relatively to the axis and direction of rotation, to carry the fluid with them rotatively and discharge it tangentially, a disk on which said blades are mounted at one end, and an annular support for the opposite ends of said blades, and a means for so mounting said rotary member as to permit the tangential escape of the fluid discharged from said blades.

9. A centrifugal fan or pump, comprising a rotary member having numerous thin elongated blades arranged lengthwise in approximately axial direction, and in substantially drum form, so as to inclose within them a relatively large and practically - unobstructed intake-chamber, and in transverse section arranged, relatively to the axis and direction of rotation, to carry the fluid with them rotatively and discharge it tangentially, a disk on which said blades are mounted at one end, and an annular support for the opposite ends of said blades, said blades formed with integral flanges at their opposite ends, and rivets uniting said flanges to said disk and annular support respectively, and a means for so mounting said rotary member as to permit the tangential escape of the fluid discharged from said blades.

10. A centrifugal fan or pump comprising stationary and rotary members, the rotary member having numerous thin elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, the blades being approximately as narrow radially and as close together as set forth, and the stationary member having an eye through which the fluid is drawn coincident with said intake-chamber and of a diameter substantially equal to that of said chamber, and having means for so mounting said rotary member as to permit the tangential escape of the fluid discharged from said blades.

11. A centrifugal fan or pump comprising stationary and rotary members, the rotary member having numerous thin elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, the blades being narrow radially in proportion substantially as set forth with supports for the opposite ends of said blades, and said blades formed with inturned flanges at their opposite ends, and rivets uniting said flanges to said supports, and the stationary member having an eye through which the fluid is drawn coincident with said intake-chamber and of a diameter substantially equal to that of said chamber, and having means for so mounting said rotary member as to permit the tangential escape of the fluid discharged from said blades.

12. A centrifugal fan or pump comprising stationary and rotary members, the rotary member having numerous elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, the blades being narrow and close together in approximately the proportions set forth, and the stationary member having an eye through which the fluid is drawn coincident with said intake-chamber and of a diameter substantially equal to that of said chamber, and having means for so mounting said rotary member as to permit the tangential escape of the fluid discharged from said blades, and the aggregate effective area of the ports between the blades of said rotary member at least equal to the area of said eye.

13. A centrifugal fan or pump comprising stationary and rotary members, the rotary member having numerous elongated blades arranged lengthwise in approximately axial direction, and in substantially drum form, so as to inclose within them a relatively large and practically-unobstructed intake-chamber, and in transverse section arranged, relatively to the axis and direction of rotation, to carry the fluid with them rotatively and discharge it tangentially, the blades being narrow radially in proportion substantially as set forth, and the stationary member comprising a casing adapted to permit the tangential escape of the fluid discharged from said blades.

In witness whereof I have hereunto signed my name in the presence of two subscribing witnesses.

SAMUEL CLELAND DAVIDSON.

Witnesses:
GEORGE GOOLD WARD,
GEORGE HENRY OSWALD STRICK.